US011242927B2

(12) United States Patent
Bhogadi et al.

(10) Patent No.: US 11,242,927 B2
(45) Date of Patent: Feb. 8, 2022

(54) ROBUST HYDRAULIC SYSTEM DISTURBANCE DETECTION AND MITIGATION

(71) Applicant: GM Global Technology Operations LLC, Detroit, MI (US)

(72) Inventors: Ramadityanand Bhogadi, Farmington Hills, MI (US); Paul G. Otanez, Franklin, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 320 days.

(21) Appl. No.: 16/420,608

(22) Filed: May 23, 2019

(65) Prior Publication Data

US 2020/0370642 A1    Nov. 26, 2020

(51) Int. Cl.
*F16H 61/06* (2006.01)
*F16H 61/662* (2006.01)
*F16H 9/04* (2006.01)

(52) U.S. Cl.
CPC ............... *F16H 61/06* (2013.01); *F16H 9/04* (2013.01); *F16H 61/66272* (2013.01); *F16H 2061/66295* (2013.01)

(58) Field of Classification Search
CPC ........... F16H 61/66272; F16H 61/0021; F16H 61/66259; F16H 9/18; F16H 57/0489; F16H 2061/66277
USPC .......................................................... 474/28
See application file for complete search history.

(56) References Cited

U.S. PATENT DOCUMENTS

| | | | | |
|---|---|---|---|---|
| 5,951,421 A | * | 9/1999 | D'Herripon | ........ F16H 57/0489 474/28 |
| 9,303,762 B2 | * | 4/2016 | Nishida | ............... F16H 61/6625 |
| 9,689,495 B2 | * | 6/2017 | Zhang | ............... F16H 61/66259 |
| 2001/0046923 A1 | * | 11/2001 | Reuschel | ................ F16D 48/00 477/44 |
| 2002/0132697 A1 | * | 9/2002 | Reuschel | ................ F16H 59/14 477/37 |
| 2005/0159269 A1 | * | 7/2005 | Godecke | ............. F16H 61/6648 476/10 |
| 2005/0233842 A1 | * | 10/2005 | Shioiri | .............. F16H 61/66272 474/19 |
| 2005/0277501 A1 | * | 12/2005 | Kuras | ................. B60W 10/101 474/8 |
| 2010/0198467 A1 | * | 8/2010 | Van Der Noll | ... F16H 61/66272 701/51 |
| 2011/0087411 A1 | * | 4/2011 | Fuller | ................. F16H 61/6648 701/61 |

(Continued)

*Primary Examiner* — Henry Y Liu
(74) *Attorney, Agent, or Firm* — Vivacqua Crane PLLC

(57) ABSTRACT

A continuously variable transmission control system includes a continuously variable transmission (CVT) including a primary variator pulley and a secondary variator pulley each including a set of pulley members defining a variable-width gap, and a flexible member positioned within the variable-width gap and movable to define a CVT ratio. The transmission control system also includes a primary pulley valve controlling a primary pulley pressure of a fluid to the primary variator pulley, a secondary pulley valve controlling a secondary pulley pressure of the fluid to the secondary variator pulley; and a pulley pressure control system configured to recognize and mitigate pressure oscillations occurring in the primary pulley pressure or in the secondary pulley pressure.

7 Claims, 3 Drawing Sheets

(56) References Cited

U.S. PATENT DOCUMENTS

| | | | | |
|---|---|---|---|---|
| 2011/0237369 A1* | 9/2011 | Van | ................... | F16H 61/66272 |
| | | | | 474/70 |
| 2011/0250998 A1* | 10/2011 | Hizuka | ................... | F16C 33/32 |
| | | | | 474/8 |
| 2012/0135829 A1* | 5/2012 | Doihara | ............ | F16H 61/66272 |
| | | | | 474/28 |
| 2012/0252612 A1* | 10/2012 | Kodama | ........... | F16H 61/66272 |
| | | | | 474/69 |
| 2012/0258825 A1* | 10/2012 | Kodama | ........... | F16H 61/66272 |
| | | | | 474/69 |
| 2012/0317969 A1* | 12/2012 | Nishida | ............. | F16H 61/66259 |
| | | | | 60/468 |
| 2014/0207350 A1* | 7/2014 | Dix | ......................... | F16D 25/14 |
| | | | | 701/68 |
| 2015/0051032 A1* | 2/2015 | Takahashi | ......... | F16H 61/66227 |
| | | | | 474/11 |
| 2015/0284003 A1* | 10/2015 | Gauthier | ........... | F16H 61/66272 |
| | | | | 701/54 |
| 2015/0316149 A1* | 11/2015 | Van Wijk | ............ | F16H 57/0435 |
| | | | | 474/28 |
| 2017/0159729 A1* | 6/2017 | Sakamoto | ............... | F16H 61/00 |
| 2017/0204970 A1* | 7/2017 | Honma | ............. | F16H 61/66272 |
| 2017/0321802 A1* | 11/2017 | Takahashi | ........... | F16H 61/0202 |
| 2017/0350503 A1* | 12/2017 | Truong | ............... | F16H 61/0021 |
| 2018/0274674 A1* | 9/2018 | Werny | .................... | G01L 5/042 |
| 2019/0003588 A1* | 1/2019 | Tatangelo | ......... | F16H 61/66231 |
| 2019/0040949 A1* | 2/2019 | Amano | ................ | F16H 61/662 |
| 2020/0116212 A1* | 4/2020 | Arai | ........................ | F16H 61/66 |

\* cited by examiner

ROBUST HYDRAULIC SYSTEM DISTURBANCE DETECTION AND MITIGATION

INTRODUCTION

The present disclosure relates to control of hydraulic pressures applied to pulleys in continuously variable transmissions during oscillating pressure conditions.

A continuously variable transmission (CVT) is a type of power transmission that is capable of achieving infinite variability between a highest and a lowest possible speed ratio. Unlike conventionally geared transmissions that use one or more planetary gear sets and multiple rotating and braking friction clutches to establish a discrete gear state, a CVT uses a variable-diameter pulley system known as a variator assembly to transition anywhere within a calibrated range of speed ratios.

A typical variator assembly includes two variator pulleys interconnected via an endless rotatable drive element such as a chain or a belt. The drive element rides in a variable-width gap defined by conical faces of mating halves of the pulleys. One of the pulleys is typically connected to an engine crankshaft and thus acts as a driving/primary pulley. The other pulley is connected to a CVT output shaft to act as a driven/secondary pulley. One or more gear sets could be used on the input and/or output side of the variator assembly depending on the design. In order to vary a CVT speed ratio, a shift force is applied to the primary pulley and/or the secondary pulley via one or more pulley actuators. The shift force effectively squeezes the pulley halves together to change the width of the gap between the conical pulley faces. Variation in the gap size, which is also referred to as the pitch radius, causes the drive element to ride higher or lower within the gap. This in turn changes the effective diameters of the variator pulleys and thus the speed ratio of the CVT.

The ratio between the speeds of the input and output shafts is desirably varied from an underdrive ratio at vehicle launch to an overdrive ratio at cruising speeds. A hydraulic pump provides hydraulic fluid pressure for ratio control. During certain conditions oscillations may be introduced in the fluid pressure applied to the variator pulleys. Such hydraulic instability may result in hardware damage or drivability concerns.

Thus, while current CVT ratio control systems achieve their intended purpose, there is a need for a new and improved system and method for pressure control during pressure instability.

SUMMARY

According to several aspects, a continuously variable transmission control system includes a continuously variable transmission (CVT) including a primary variator pulley and a secondary variator pulley each including a set of pulley members defining a variable-width gap, and a flexible member positioned within the variable-width gap and movable to define a CVT ratio. The transmission control system also includes a primary pulley valve controlling a primary pulley pressure of a fluid to the primary variator pulley and a secondary pulley valve controlling a secondary pulley pressure of the fluid to the secondary variator pulley. The transmission control system further includes a pulley pressure control system configured to recognize and mitigate pressure oscillations occurring in the primary pulley pressure or in the secondary pulley pressure.

In an additional aspect of the transmission control system of the present disclosure, the pulley pressure control system is configured to recognize pressure oscillations by measuring the primary pulley pressure or the secondary pulley pressure and calculating a pressure oscillation energy value based on the measured pulley pressure.

In another aspect of the transmission control system of the present disclosure, filtering is applied to the measured pulley pressure prior to calculating the pressure oscillation energy value.

In a further aspect of the transmission control system of the present disclosure, a passband of the filter is selected to reject frequencies associated with pressure commands to the first or second pulley valve.

In an additional aspect of the transmission control system of the present disclosure, the pressure oscillation energy value is calculated by applying correlation to the measured pulley pressure.

In another aspect of the transmission control system of the present disclosure, a flag is set when the pressure oscillation energy value exceeds a first predetermined threshold for a first predetermined time duration.

In a further aspect of the transmission control system of the present disclosure, the flag is cleared when the pressure oscillation energy value stays below a second predetermined threshold for a second predetermined time duration.

In an additional aspect of the transmission control system of the present disclosure, closed-loop control is used to control the primary or secondary pulley pressure when the flag associated with the corresponding primary or secondary pulley is not set.

In another aspect of the transmission control system of the present disclosure, open-loop control is used to control the primary pulley pressure or the secondary pulley pressure when the flag associated with the corresponding primary or secondary pulley is set.

According to several aspects, a method of controlling a transmission is disclosed. The transmission includes a continuously variable transmission (CVT) including a primary variator pulley and a secondary variator pulley each including a set of pulley members defining a variable-width gap, and a flexible member positioned within the variable-width gap and movable to define a CVT ratio. The transmission also includes a primary pulley valve controlling a primary pulley pressure of a fluid to the primary variator pulley, and a secondary pulley valve controlling a secondary pulley pressure of the fluid to the secondary variator pulley. The method includes the steps of recognizing pressure oscillations occurring in the primary pulley pressure or in the secondary pulley pressure, and controlling the primary pulley pressure or the secondary pulley pressure so as to mitigate recognized oscillations.

In another aspect of the method of the present disclosure, the step of recognizing pressure oscillations includes measuring the primary pulley pressure or the secondary pulley pressure and calculating a pressure oscillation energy value based on the measured pulley pressure.

In a further aspect of the method of the present disclosure, filtering is applied to the measured pulley pressure prior to calculating the pressure oscillation energy value.

In an additional aspect of the method of the present disclosure, a passband of the filter is selected to reject frequencies associated with pressure commands to the first or second pulley valve.

In another aspect of the method of the present disclosure, the step of calculating the pressure oscillation energy value comprises applying correlation to the measured pulley pressure.

In further aspect of the method of the present disclosure, a flag is set when the pressure oscillation energy value exceeds a first predetermined threshold for a first predetermined time duration.

In an additional aspect of the method of the present disclosure, the flag is cleared when the pressure oscillation energy value stays below a second predetermined threshold for a second predetermined time duration.

In another aspect of the method of the present disclosure, closed-loop control is used to control the primary or secondary pulley pressure when the flag associated with the corresponding primary or secondary pulley is not set.

In another aspect of the method of the present disclosure, open-loop control is used to control the primary pulley pressure or the secondary pulley pressure when the flag associated with the corresponding primary or secondary pulley is set.

According to several aspects, a continuously variable transmission control system includes a continuously variable transmission (CVT) including a primary variator pulley and a secondary variator pulley each including a set of pulley members defining a variable-width gap, and a flexible member positioned within the variable-width gap and movable to define a CVT ratio. The transmission control system further includes a primary pulley valve controlling a primary pulley pressure of a fluid to the primary variator pulley, a secondary pulley valve controlling a secondary pulley pressure of the fluid to the secondary variator pulley, and a pulley pressure control system configured to recognize and mitigate pressure oscillations occurring in the primary pulley pressure or in the secondary pulley pressure. The pulley pressure control system is configured to recognize pressure oscillations by measuring the primary pulley pressure or the secondary pulley pressure and calculating a pressure oscillation energy value based on the measured pulley pressure. Filtering is applied to the measured pulley pressure prior to calculating the pressure oscillation energy value wherein a passband of the filter is selected to reject frequencies associated with pressure commands to the first or second pulley valve. The pressure oscillation energy value is calculated by applying correlation to the measured pulley pressure. A flag is set when the pressure oscillation energy value exceeds a first predetermined threshold for a first predetermined time duration, and the flag is cleared when the pressure oscillation energy value stays below a second predetermined threshold for a second predetermined time duration. Closed-loop control is used to control the primary or secondary pulley pressure when the flag associated with the corresponding primary or secondary pulley is not set, and open-loop control is used to control the primary pulley pressure or the secondary pulley pressure when the flag associated with the corresponding primary or secondary pulley is set.

In a further aspect of the disclosed transmission control system, filtering is applied to the measured pulley pressure prior to calculating the pressure oscillation energy value wherein a passband of the filter is selected to reject frequencies associated with pressure commands to the first or second pulley valve.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
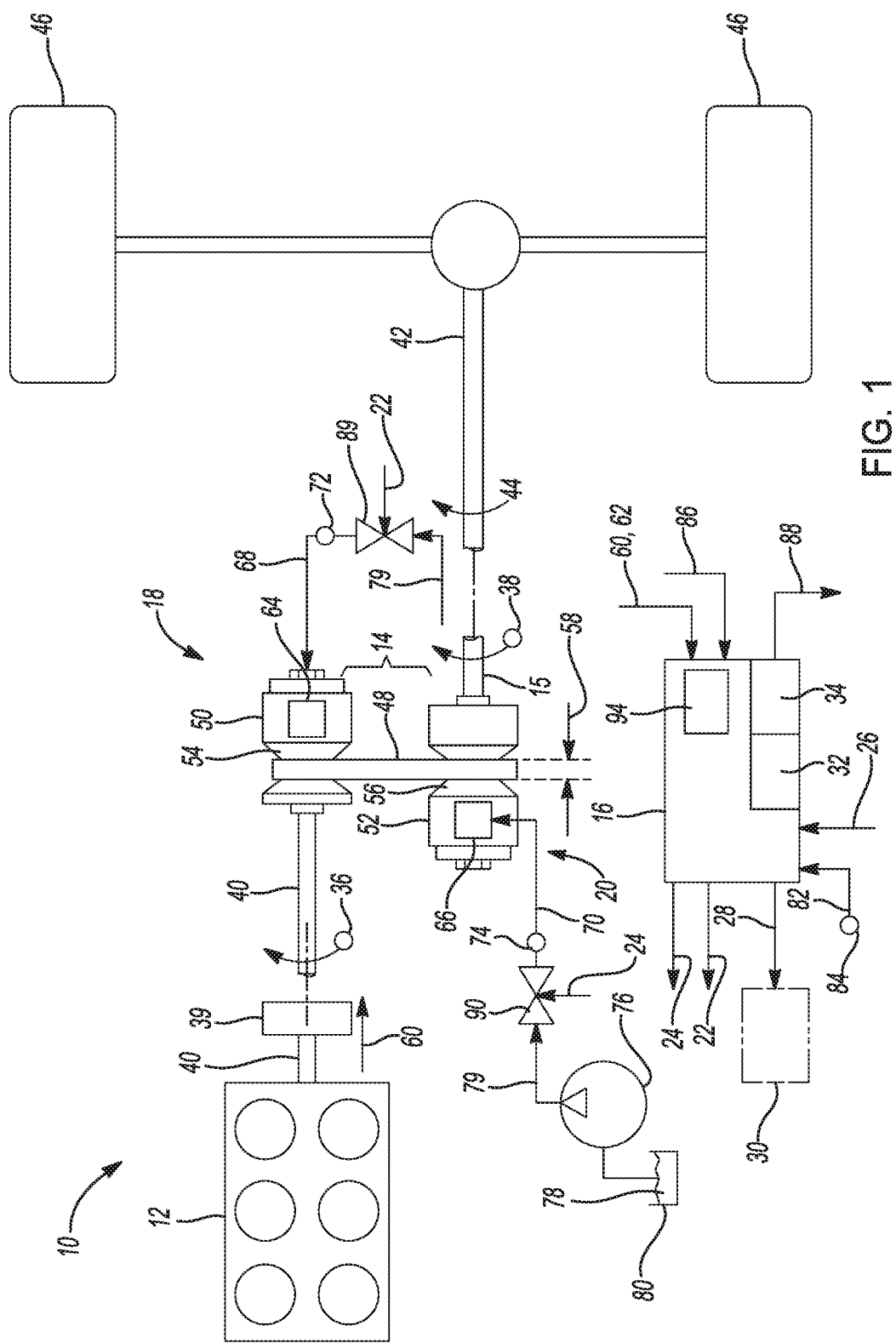
FIG. 1 is a schematic illustration of a continuously variable transmission pressure control system according to an exemplary embodiment.

Referring to the drawings, wherein like reference numbers correspond to like or similar components throughout the several figures, a vehicle 10 is shown schematically in FIG. 1. The vehicle 10 includes a torque generating device 12, shown for example as an internal combustion engine, but which also may be embodied as a battery powered electrical motor device or other suitable device operable for generating output torque. For illustrative consistency, the torque generating device 12 will be described hereinafter as an engine 12 without limiting the scope to such a design.

The vehicle 10 also includes a continuously variable transmission (CVT) 14 and a controller 16. The CVT 14 includes a primary variator pulley 18 and a secondary variator pulley 20. The controller 16 is programmed to perform speed ratio control and to calculate a current speed ratio of the CVT 14, and to perform other actions with respect to the CVT 14. The controller 16 is further programmed to transmit a primary pulley pressure control signal 22, and a secondary pulley pressure control signal 24 to the primary and secondary variator pulleys 18 and 20 during normal operation.

The controller 16 may be configured as one or more computer devices having a memory 32. The controller 16 may include hardware elements such as a processor 34, circuitry including but not limited to a timer, oscillator, analog-to-digital circuitry, digital-to-analog circuitry, proportional-integral-derivative (PID) control logic, a digital signal processor, and any necessary input/output devices and other signal conditioning and/or buffer circuitry. The memory 32 may include tangible, non-transitory memory such as read only memory, e.g., magnetic, solid-state/flash, and/or optical memory, as well as sufficient amounts of random-access memory, electrically erasable programmable read-only memory, and the like. Steps embodying a method of operating the system of the present disclosure may be recorded in the memory 32 and executed by the processor 34 in the overall control of the vehicle 10.

The engine 12 includes an output shaft or crankshaft 40. The crankshaft 40 is connected to the CVT 14, which in turn includes an output shaft 42. The output shaft 42 ultimately delivers output torque 44 to a set of driven wheels 46. The CVT 14 includes the primary variator pulley 18, which is connected to and driven by the crankshaft 40, the secondary variator pulley 20 which is connected to the output shaft 42, and a flexible continuous rotating drive element or CVT chain 48. The term "chain" as used herein refers to any closed/endless loop of metal and/or rubber suitable for transmitting torque from the primary variator pulley 18 to the secondary variator pulley 20, including a loop of chain or a conventional rubber and metal CVT drive belt. For simplicity, the term "chain" is used hereinafter to refer to any suitable endless rotatable element.

The primary and secondary variator pulleys 18 and 20 each define a set of pulley members, each set having a fixed portion having conical faces and an oppositely directed mating half 50 and 52, respectively, with respective conical faces 54 and 56 that are oppositely movable to define a variable-width gap 58. The chain 48 is positioned within the gap 58 and rides on the conical faces 54 and 56 as the engine 12 powers the primary variator pulley 18 at an engine or primary pulley speed 60, which thus acts as the input speed/primary speed of the primary variator pulley 18. The secondary variator pulley 20 rotates at a secondary pulley speed 62.

The width of the gap 58 may be varied via movement of the mating halves 50 and/or 52 as to change the speed ratio of the CVT 14. Therefore, the vehicle 10 of FIG. 1 includes respective first and second variator actuators 64 and 66 each responsive to primary and secondary pressures 68 and 70 respectively, measurable via corresponding pulley pressure sensors 72, 74 which move the respective primary and secondary variator pulleys 18 and 20 toward each other. A return spring (not shown) or other return mechanism within at least one of the primary and secondary variator pulleys 18 and 20 moves the primary and secondary variator pulleys 18 and 20 away from each other when the respective primary and secondary pressures 68, 70 are released. While shown schematically in FIG. 1 for illustrative simplicity, an example embodiment of the first and second actuators 64 and 66 includes a hydraulic piston/cylinder system, although other linear actuators may be used such as electromechanical devices or pneumatic pistons.

The first actuator 64 of FIG. 1 acts on a moveable one of the mating halves 50 of the primary variator pulley 18 in response to application of the primary pressure 68. Likewise, the second actuator 66 acts on a moveable one of the mating halves 52 of the secondary variator pulley 20 in response to the secondary pressure 70. Line pressure may be provided to the CVT 14 via a fluid pump 76 as shown, with the fluid pump 76 drawing a fluid 78 such as oil from a sump 80 and circulating the fluid 78 to the CVT 14 via hoses, fittings, and other suitable fluid conduit 79.

The controller 16, which is in communication with the first and second actuators 64 and 66, receives a set of control inputs. The control inputs may include a vehicle speed 82 as reported, calculated, or measured by one or more wheel or transmission output speed sensors 84, the primary and secondary pulley speeds 60, 62, and an output torque request 86. As is known in the art, the output torque request 86 is typically determined by actions of a driver of the vehicle 10, such as via the present throttle request, braking levels, gear state, and the like. The controller 16 may further direct the opening or closing of a primary pulley valve 89 by means of a primary pressure control signal 22 which controls flow of the fluid 78 to the primary variator pulley 18. The controller 16 may further direct the opening of a secondary pulley valve 90 which controls flow of the fluid 78 to the secondary variator pulley 20.

The CVT speed ratio may be controlled by controlling the primary pulley pressure 68 and the secondary pulley pressure 70. An exemplary algorithm for CVT speed ratio control may use feedforward control and feedback control to determine a speed ratio change rate based on a commanded speed ratio, a desired speed ratio, and an actual speed ratio. The algorithm may determine the primary pulley pressure control signal 22 and the secondary pulley pressure control signal 24 to be transmitted to the primary pulley valve 89 and the secondary pulley valve 90 respectively to achieve the desired CVT speed ratio. Closed loop control is generally used to determine a commanded pulley pressure for the primary variator pulley 18 and the secondary variator pulley 20. The primary pulley pressure 68 is measured by the primary pressure sensor 72, and the secondary pulley pressure 70 is measured by the secondary pressure sensor 74. In closed loop control, the measured pulley pressure 68, 70 is compared to a respective desired pulley pressure, and the respective pulley pressure control signal 22, 24 is adjusted based on the difference between measured and desired pulley pressure.

Under certain operating conditions, such as an actuator hitting a travel limit or as a result of fast-acting valves or actuators, pressure transients may be created. If not recognized and accounted for, such pressure transients may result in oscillation occurring in the primary pulley pressure 68 or in the secondary pulley pressure 70. As a consequence, vehicle drivability or hardware reliability may be degraded.

Figure 2:
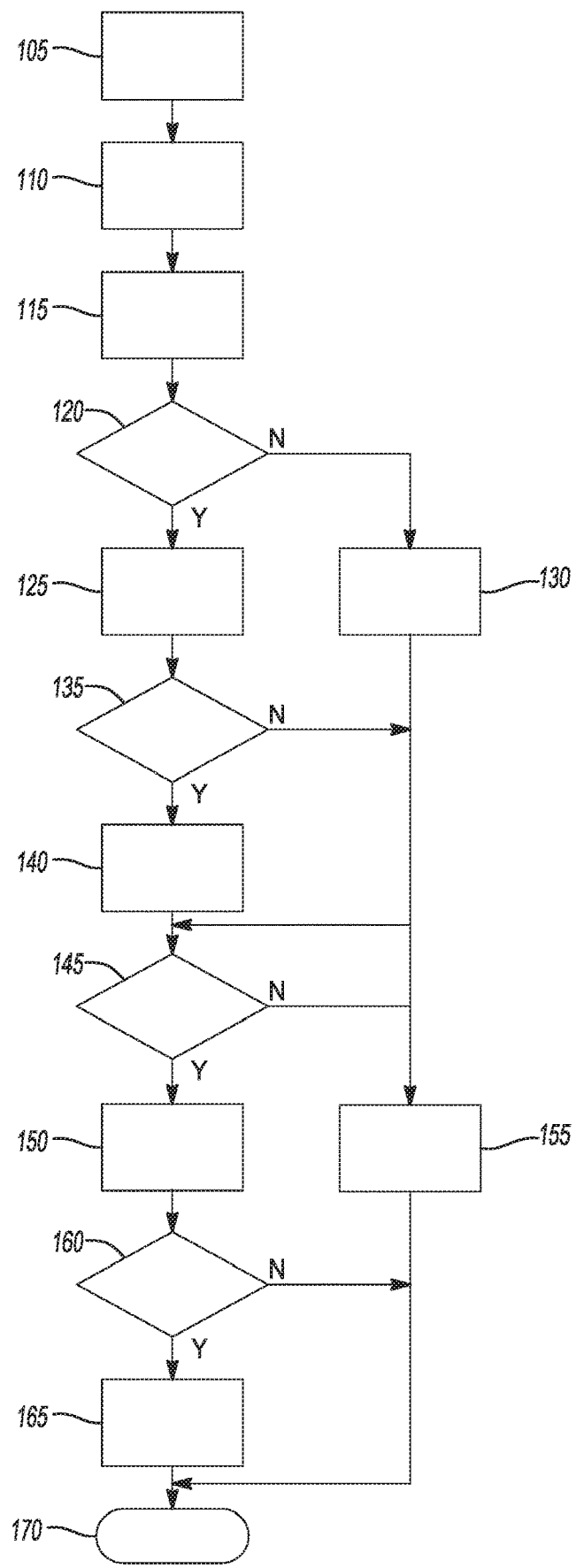
FIG. 2 is a flowchart of a disturbance detection and mitigation algorithm according to an exemplary embodiment.

With reference to FIG. 2, an algorithm 100 may be used to recognize disturbances in pulley pressure. The discussion of the algorithm 100 that follows is directed to one pulley pressure, for example the primary pulley pressure 68 or the secondary pulley pressure 70. It will be appreciated that the algorithm 100 may advantageously be applied to both the primary pulley pressure 68 and the secondary pulley pressure 70 in a CVT system 14. It will also be recognized that the exemplary algorithm 100 illustrates a non-limiting example that may include optional steps and features that are not intended to limit the scope of the present disclosure as defined in the claims that follow.

Continuing to refer to FIG. 2, a flow chart of an exemplary algorithm 100 is presented for detecting if hydraulic disturbances requiring mitigation are present. The algorithm 100 is executed periodically during vehicle operation. Execution of the algorithm 100 may be initiated based upon predetermined time intervals, or alternatively execution of the algorithm 100 may be based on occurrence of a specific event or on the presence of a specific condition. Upon entering the algorithm 100, in step 105 a signal that represents hydraulic pressure is received, for example from pressure sensor 72 for the primary pulley pressure or from pressure sensor 74 for the secondary pulley pressure. The exemplary algorithm 100 then proceeds to step 110. In step 110, filtering is applied to the pressure signal received in step 105, in order to reject oscillatory frequency content not associated with the hydraulic disturbances of interest. The rejected oscillatory content may include frequencies associated with pressure commands to the pulley valve. The rejected oscillatory content may additionally or alternatively include high-frequency noise. In an exemplary embodiment, the applied filter is a bandpass filter. In other embodiments, the filter may be another type of filter including but not limited to a low-pass, a high-pass, or a notch filter. The algorithm then proceeds to step 115.

With continued reference to FIG. 2, in step 115 an oscillation energy value is calculated based on the filtered pressure signal from step 110. The oscillation energy value may be determined by known techniques including but not limited to correlation. Correlation can be defined mathematically by the equation:

$$(f * g)[n] \triangleq \sum_{m=-\infty}^{\infty} \overline{f[m]} g[m+n]$$

where m is the time step and n is a discrete time delay. The oscillation energy may alternatively be determined using autocorrelation, where n=0 and g is replaced by f in the equation above. As used herein, the term "correlation" is used to describe both the general relationship defined in the equation above and the special case of autocorrelation.

The algorithm then proceeds to decision step 120, where the calculated oscillation energy value is compared to a predetermined enable threshold energy value. The predetermined enable threshold energy value may be different for the primary pulley pressure than for the secondary pulley pressure. The predetermined enable threshold energy value may also be modified as a function of a parameter including but not limited to temperature, oil level, oil type, and oil life. If it is determined in step 120 that the calculated oscillation energy value is not greater than the enable threshold energy value, an enable timer is reset in step 130, and the algorithm proceeds to step 145. If it determined in step 120 that the calculated oscillation energy value is greater than the enable threshold energy value, the algorithm proceeds to step 125, where the enable timer is incremented. From step 125, the algorithm proceeds to decision step 135, where the enable timer value is compared to a predetermined enable time duration. The predetermined enable time duration may be different for the primary pulley pressure than for the secondary pulley pressure. The predetermined enable time duration may also be modified as a function of a parameter including but not limited to temperature, oil level, oil type, and oil life. If it is determined in step 135 that the enable timer value is not greater than the enable time duration, the algorithm proceeds to step 145. If it is determined in step 135 that the enable timer value is greater than the enable time duration, indicating that the oscillation energy value has been above a predetermined enable energy threshold for a predetermined enable time duration, an "oscillation detected" flag is set in step 140, and the algorithm proceeds to step 145.

Continuing to refer to FIG. 2, in decision step 145 the oscillation energy value that was calculated in step 115 is compared to a predetermined disable threshold energy value. The predetermined disable threshold energy value may be different for the primary pulley pressure than for the secondary pulley pressure. The predetermined disable threshold energy value may also be modified as a function of a parameter including but not limited to temperature, oil level, oil type, and oil life. If it is determined in step 145 that the calculated oscillation energy value is not less than the disable threshold energy value, a disable timer is reset in step 155, and the algorithm proceeds to step 170. If it determined in step 145 that the calculated oscillation energy value is less than the disable threshold energy value, the algorithm proceeds to step 150, where the disable timer is incremented. From step 150, the algorithm proceeds to decision step 160, where the disable timer value is compared to a predetermined disable time duration. The predetermined disable time duration may be different for the primary pulley pressure than for the secondary pulley pressure. The predetermined disable time duration may also be modified as a function of a parameter including but not limited to temperature, oil level, oil type, and oil life. If it is determined in step 160 that the disable timer value is not greater than the disable time duration, the algorithm proceeds to step 170. If it is determined in step 160 that the disable timer value is greater than the disable time duration, indicating that the oscillation energy value has been below a predetermined disable energy threshold for a predetermined disable time duration, an "oscillation detected" flag is cleared in step 140, and the algorithm proceeds to step 170. At step 170, the algorithm 100 returns to await the next initiation of the oscillation detection algorithm 100 by the controller 16.

The control of the primary pulley pressure 68 and/or the secondary pulley pressure 70 described above may be modified based on the state of the "oscillation detected" flag associated with the corresponding pulley pressure 68, 70. In an embodiment, the controller 16 may determine the state of the oscillation detected flag, and in the event the "oscillation detected" flag is not set the pulley pressure 68, 70 may be controlled on a closed loop basis as described earlier. In the event the "oscillation detected" flag is set for the particular pulley pressure 68, 70, the pulley pressure is controlled on an open loop basis based on a predetermined pulley pressure control signal 22, 24. During open loop operation, the measured signal that represents hydraulic pressure, for example from pressure sensor 72 for the primary pulley pressure or from pressure sensor 74 for the secondary pulley pressure, is not used to determine a pulley pressure control signal 68, 70 on a closed loop basis. However, the signals from the primary pulley pressure sensor 72 and the secondary pulley pressure sensor 74 continue to be read during open loop operation and are used as the input to step 105 in the algorithm 100 of FIG. 2 to determine when oscillation energy has decreased by a sufficient level for a sufficient time to allow the "oscillation detected" flag to be cleared and closed loop pressure control to resume.

Figure 3:
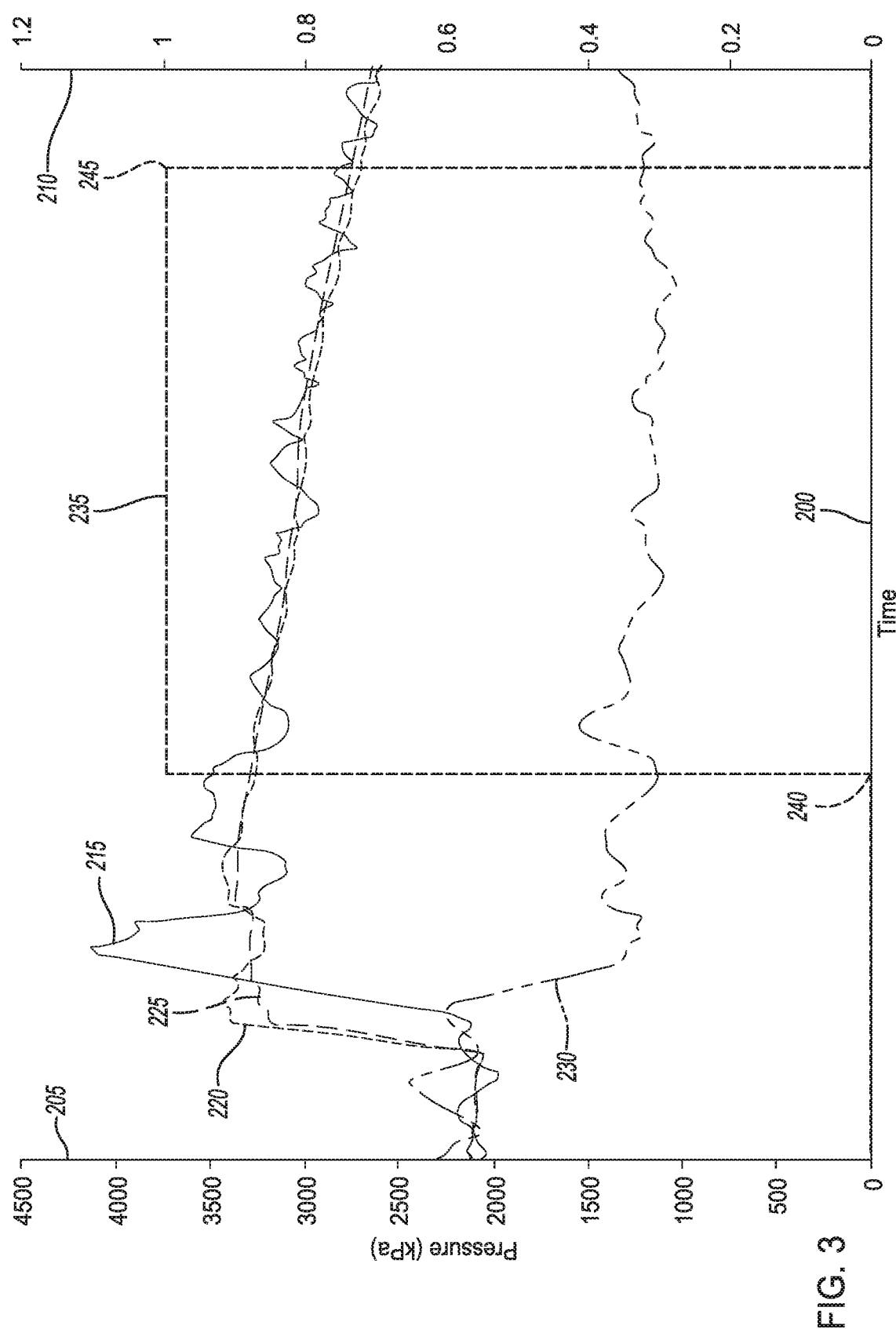
FIG. 3 is a graph showing hydraulic pressures in a CVT system according to an exemplary embodiment.

FIG. 3 is a graph showing hydraulic pressures in a CVT system according to an exemplary embodiment. In the graph of FIG. 3 the x-axis 200 represents time, the primary y-axis 205 on the left side of the graph is a pressure scale in kPa for the traces 215, 220, and 225. The secondary y-axis on the right side of the graph is a scale for the traces 230 and 235. In FIG. 3, the trace 215 represents actual primary pulley pressure 68. Trace 220 in FIG. 3 represents closed loop commanded pressure, and trace 225 represents a base pressure command without a closed loop contribution. Trace 230 in FIG. 3 represents TCR, defined as a ratio of applied torque input to clamping torque, plotted against the scale on the secondary y-axis 210. The trace 235 in FIG. 3 represents the status of the "oscillation detected" flag described earlier with reference to FIG. 2, with value of 0 indicating the "oscillation detected" flag is not set and a value of 1 indicating that the "oscillation detected" flag is set. Referring to FIG. 3 and FIG. 2, the actual pulley pressure 215 starts to exhibit oscillatory behavior, which continues at a sufficient energy for a sufficient time until the algorithm 100 sets the "oscillation detected" flag 235 at the time indicated by the reference numeral 240. During the time interval in which the "oscillation detected" flag 235 is set, i.e. the time interval from reference numeral 240 until reference numeral 245, the controller 16 uses open loop control for primary pulley pressure 68. After the oscillation energy has remained sufficiently low for a sufficient time, the "oscillation detected" flag is cleared at the time indicated by reference numeral 245, and closed loop control of primary pulley pressure is resumed.

A system and method of the present disclosure offers several advantages. These include minimizing the risk of pressure oscillations that could result in drivability concerns or hardware damage, which could result in warranty costs. This can be achieved without undesirably slowing system response time in the absence of oscillations. Additionally, the system and method disclosed herein allows for adaptability to a range of vehicle applications by selection of calibration parameters such as oscillation energy thresholds and time durations associated with setting and clearing the "oscillation detected" flag.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A continuously variable transmission control system, comprising:
   a continuously variable transmission (CVT) including a primary variator pulley and a secondary variator pulley each including a set of pulley members defining a variable-width gap, and a flexible member positioned within the variable-width gap and movable to define a CVT ratio;
   a primary pulley valve controlling a primary pulley pressure of a fluid to the primary variator pulley;
   a secondary pulley valve controlling a secondary pulley pressure of the fluid to the secondary variator pulley; and
   a pulley pressure control system configured to recognize and mitigate pressure oscillations occurring in the primary pulley pressure or in the secondary pulley pressure, wherein the pulley pressure control system is configured to recognize pressure oscillations by measuring the primary pulley pressure or the secondary pulley pressure and calculating a pressure oscillation energy value based on the measured pulley pressure, wherein filtering is applied to the measured pulley pressure prior to calculating the pressure oscillation energy value.

2. The system of claim 1, wherein a passband of the filter is selected to reject frequencies associated with pressure commands to the first or second pulley valve.

3. A continuously variable transmission control system, comprising:
   a continuously variable transmission (CVT) including a primary variator pulley and a secondary variator pulley each including a set of pulley members defining a variable-width gap, and a flexible member positioned within the variable-width gap and movable to define a CVT ratio;
   a primary pulley valve controlling a primary pulley pressure of a fluid to the primary variator pulley;
   a secondary pulley valve controlling a secondary pulley pressure of the fluid to the secondary variator pulley; and
   a pulley pressure control system configured to recognize and mitigate pressure oscillations occurring in the primary pulley pressure or in the secondary pulley pressure, wherein the pulley pressure control system is configured to recognize pressure oscillations by measuring the primary pulley pressure or the secondary pulley pressure and calculating a pressure oscillation energy value based on the measured pulley pressure, wherein the pressure oscillation energy value is calculated by applying correlation to the measured pulley pressure.

4. A continuously variable transmission control system, comprising:
   a continuously variable transmission (CVT) including a primary variator pulley and a secondary variator pulley each including a set of pulley members defining a variable-width gap, and a flexible member positioned within the variable-width gap and movable to define a CVT ratio;
   a primary pulley valve controlling a primary pulley pressure of a fluid to the primary variator pulley;
   a secondary pulley valve controlling a secondary pulley pressure of the fluid to the secondary variator pulley; and
   a pulley pressure control system configured to recognize and mitigate pressure oscillations occurring in the primary pulley pressure or in the secondary pulley pressure, wherein the pulley pressure control system is configured to recognize pressure oscillations by measuring the primary pulley pressure or the secondary pulley pressure and calculating a pressure oscillation energy value based on the measured pulley pressure, wherein a flag is set when the pressure oscillation energy value exceeds a first predetermined threshold for a first predetermined time duration.

5. The system of claim 4, wherein the flag is cleared when the pressure oscillation energy value stays below a second predetermined threshold for a second predetermined time duration.

6. The system of claim 5, wherein closed-loop control is used to control the primary or secondary pulley pressure when the flag associated with the corresponding primary or secondary pulley is not set.

7. The system of claim 6, wherein open-loop control is used to control the primary pulley pressure or the secondary pulley pressure when the flag associated with the corresponding primary or secondary pulley is set.

* * * * *